(12) United States Patent
Seitz et al.

(10) Patent No.: US 6,222,627 B1
(45) Date of Patent: Apr. 24, 2001

(54) WOLLASTON PRISM AND USE OF IT IN A FOURIER-TRANSFORM SPECTROMETER

(75) Inventors: Peter Seitz, Urdorf; Martin Stalder, Oberwil, both of (CH)

(73) Assignee: Csem Centre Suisse d'Electronique et de Microtechnique SA-Recherche et Developpment, Neuchatel (CH)

( * ) Notice: Subject to any disclaimer, the term of this patent is extended or adjusted under 35 U.S.C. 154(b) by 0 days.

(21) Appl. No.: 09/256,862

(22) Filed: Feb. 24, 1999

(30) Foreign Application Priority Data

Feb. 28, 1998 (EP) .................................. 98103533

(51) Int. Cl.[7] .............................. G01J 3/28; G02B 7/18; G02B 5/04
(52) U.S. Cl. ........................... 356/326; 359/831; 359/837
(58) Field of Search ..................................... 359/831, 837; 356/326

(56) References Cited

U.S. PATENT DOCUMENTS

| | | | |
|---|---|---|---|
| 4,072,422 | * | 2/1978 | Tanaka et al. .......................... 356/108 |
| 5,508,992 | * | 4/1996 | Hirose et al. .......................... 369/109 |
| 5,850,380 | * | 12/1998 | Kubo ..................................... 369/110 |

FOREIGN PATENT DOCUMENTS

| | | |
|---|---|---|
| 1 273 223 | 7/1968 | (DE) . |
| 576 072 A1 | 12/1993 | (EP) . |

OTHER PUBLICATIONS

WO 95/02171, Jan. 19, 1996 (19.01.95).
Patent Abstracts of Japan, Publication No. 05181016, Publication Date Jul. 23, 1993.
Patent Abstracts of Japan, Publication No. 05028578, Publication Date Feb. 5, 1993.

* cited by examiner

*Primary Examiner*—Frank G. Font
*Assistant Examiner*—Zandra Smith
(74) *Attorney, Agent, or Firm*—Pearne & Gordon LLP

(57) ABSTRACT

The present invention is related to a Wollaston prism (WP) comprising two birefringent wedges (W1, W2) joined by their hypotenuse to form a composite block, said wedges having optic axes (OA1, OA2) to each other at right angle. According to the invention, the optic axes (OA1, OA2) of said wedges (W1, W2) are rotated by an angle of 45° or 135°, respectively, with regard to a position wherein one of the optic axes (OA1, OA2) lies parallel to the plane formed by the hypotenuse.

In an embodiment of the present invention, liquid crystal is used as material for the wedges (W1, W2) resulting in inexpensive and easy to handle Wollaston prisms.

9 Claims, 4 Drawing Sheets

WOLLASTON PRISM AND USE OF IT IN A FOURIER-TRANSFORM SPECTROMETER

BACKGROUND OF THE INVENTION

The present invention is related to a Wollaston prism formed by two birefringent wedges having optic axis to each other at right angle, to a Fourier-transform spectrometer comprising said Wollaston prism, and to a method to adjust said Fourier-transform spectrometer.

A Wollaston prism is comprised of two similar wedges of birefringent material joined by their hypotenuse to form a rectangular block. The optic axes within the two wedges are aligned perpendicular to each other and parallel to the entrance/exit faces of the composite block. The angle of refraction at the internal interface of the Wollaston prism depends on the polarization state of light and hence leads to the customary use of a Wollaston prism as a polarizing beam splitter.

Conventional Fourier-transform spectrometers are based on Michelson interferometers. When the output of the interferometer is recorded as a function of the path difference between two arms, an interferogram is obtained that is the autocorrelation of the optical field. The power spectrum of the Fourier transform of the interferogram corresponds to the spectral energy or power distribution of the input light. Draw-backs associated with these instruments are that high quality mirror-scanning mechanisms are required, and the temporal resolution is limited by the maximum mechanical scanning rate.

As an alternative, a Wollaston prism may be used in a Fourier-transform spectrometer with no moving parts. It is well known in the state of the art that when a Wollaston prism is placed between two suitably oriented polarizers and illuminated with a light source, a set of straight-line interference fringes will be produced localized to a plane within the prism. These fringes are the Fourier transform of the spectral power distribution.

Although the use of Wollaston prisms in Fourier-transform spectrometers has been proposed earlier, it could not be applied without a suitable scanning device having a high resolution. Such a high-resolution scanning device has been described by Takayuki Okamoto et. al. in "A Photodiode Array Fourier Transform Spectrometer based on a Birefringent Interferometer" (Applied Spectroscopy 40, p. 691 to 695, 1986).

The varying path difference across the Wollaston prism of the above-mentioned Fourier-transform spectrometer results in the formation of interference fringes localized to a imaging plane within the Wollaston prism. For that reason, an imaging lens must be provided to image the interference plane onto the scanning device in order to obtain best results with regard to the contrast of the image.

All of the above-described Fourier-transform spectrometer have the general draw-back that the angle of incidence for a light beam to be analyzed is very small, i.e. measures must be taken to reduce the angular extent of this light beam and the spectrometer must be precisely adjusted in order to obtain acceptable results.

To overcome this draw-back, a design of a static Fourier-transform spectrometer based on a Wollaston prism has been presented by J. Courtial et. al. in "Design of a static Fourier-transform spectrometer with increased field of view" (Applied Optics, Vol. 35, No. 34, Dec. 1, 1996, p. 6698–6702). The field of view is increased by including an achromatic $\lambda/2$-plate ($\lambda$: wavelength) between the prisms or by combining prisms fabricated from positive and negative birefringent materials. These materials are expensive and are therefore not suitable for any mass product.

SUMMARY OF THE INVENTION

An object of the present invention is to eliminate the above mentioned draw-backs, in particular, the object of the present invention is to increase the maximum angle of incidence of light, i.e. the field of view (angle acceptance), and, at the same time, using inexpensive materials for obtaining best results.

The present invention is directed toward a Wollaston prism formed by two birefringent wedges joined by their hypotenuses to form a block. The wedges have optic axes that are at right angles to each other and are rotated by an angle with regard to a position wherein one of the optic axes is parallel to a plane formed by their hypotenuses. Further advantageous embodiments of the present invention, a Fourier-transform spectrometer and a method to adjust said Fourier-transform spectrometer are also provided by the present invention.

The present invention has the following advantages: By making use of optical axes orientation of 45° and 135°, respectively, the field of view for the Wollaston prism is increased.

The field of view can even further be increased as follows: Unlike the above-mentioned prism of the prior art, the Wollaston prism of the invention shows a non-homogeneous orientation (or twist) of the optic axes within the wedges. Such twist causes a polarization rotation of the incident light polariszation by 45°, 90°, 135° and 180°, respectively.

Liquid crystal is a material which is very inexpensive compared to the materials of the state of the art. In turn, it is possible to provide inexpensive Fourier-transform spectrometers.

BRIEF DESCRIPTION OF THE DRAWINGS

Exemplified embodiments of the present invention will be described in the following referring to drawings, which show in FIG. 1 a known Fourier-transform spectrometer comprising a Wollaston prism, FIG. 2 an interference fringe pattern resulting from illuminating the Wollaston prism represented in FIG. 1, FIG. 3 a polarization interferometer with a cylindrical lens focusing the light on a scanning device, FIG. 4 an interference fringe pattern of 45°-Wollaston prism according to the present invention, FIG. 5 a Wollaston prism according to the present invention having liquid crystal elements that induce a polarization rotation of 90°, and FIG. 6 a further Wollaston prism according to the present invention having liquid crystal elements that induce a polarization rotation of 90°.

DETAILED DESCRIPTION OF THE PREFERRED EMBODIMENTS

Figure 1:
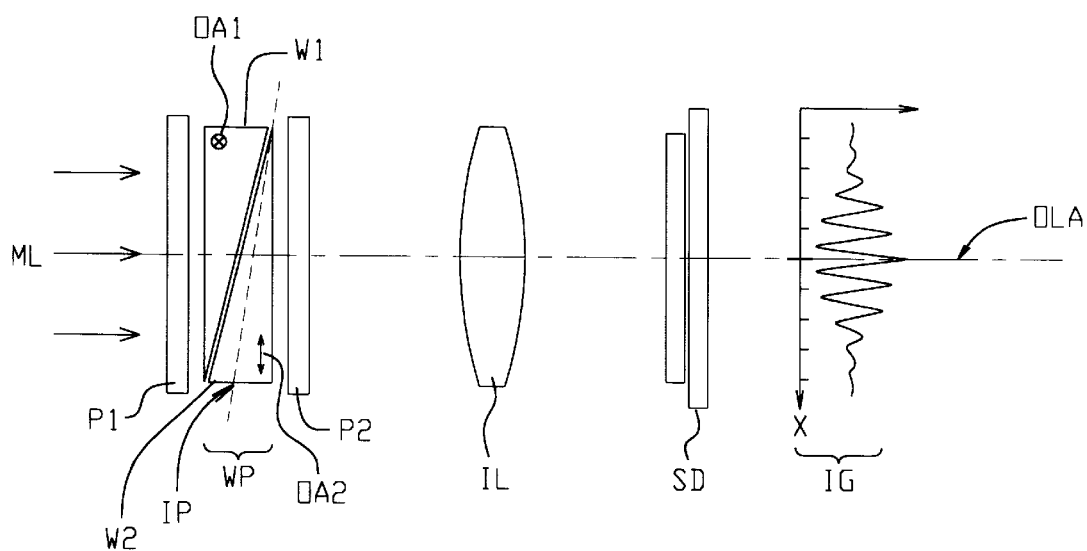

In FIG. 1, an arrangement is represented for a known spectrometer using a Wollaston prism WP. The spectrometer comprises two polarizers P1 and P2, the Wollaston prism WP in between the two polarizers P1 and P2, an imaging lens IL and a scanning device SD.

By the polarizer P1, a monochromatic input light ML is linearly polarized at 45° to optic axes OA1 and OA2 of the Wollaston prism WP, giving equal transmission intensities for the horizontally and vertically polarized components. A second 45° polarizer P2 placed after the Wollaston prism WP analyzes the transmitted light, permitting the two orthogonal polarizations to interfere. It can be shown, that a path difference between the two components depends on the lateral position across the Wollaston prism WP. The varying path difference across the Wollaston prism WP results in the formation of interference fringes localized to a interference plane IP within the Wollaston prism WP. The imaging lens IL images the interference plane IP onto the scanning device SD, and the resulting interferogram IG is recorded with a microprocessor (not shown in FIG. 1).

The above-mentioned Fourier-transform spectrometer is further described in "Single-pulse, Fourier-transform spectrometer having no moving parts" by M. J. Padgett et. al. (Applied Optics, Vol. 33 (4), p. 6035–6040, 1994) or in "A Photodiode Array Fourier-Transform Spectrometer based on a Birefringent Interferometer" by Takayuki Okamoto et. al. (Applied Spectroscopy, Vol. 40, p. 691–695, 1986).

To obtain best results regarding the signal to noise ratio of the interferogram and, therefore, also of the power spectrum, it is important to increase the incidental light on the scanning device as much as possible. This can be achieved by, for example, a cylindrical lens by which the angle of incidence (angle acceptance) is increased. Through the increased angle of incidence the interferogram is displaced and the contrast is therefore decreased. The maximum angle of incidence is different for each type of interferometer, and it is the aim to have the largest possible angle of incidence.

Several methods have been proposed to increase the angle acceptance. For example, M. Fracon et. al. have proposed in "Polarization Interferometers" (Wiley-Interscience London, N.Y., 1971) to compensate the birefringence of the Wollaston prism using two birefringent plates with an anisotropy having opposite signs. Unfortunately, this known teaching has the draw-back that rather expensive crystals must be used to obtain positive and negative birefringence. Another possibility, proposed by the same authors, consists in using an achromatic $\lambda/2$-delay plate to rotate the polarization vector by 90° between two identical birefringent wedges.

Figure 2:
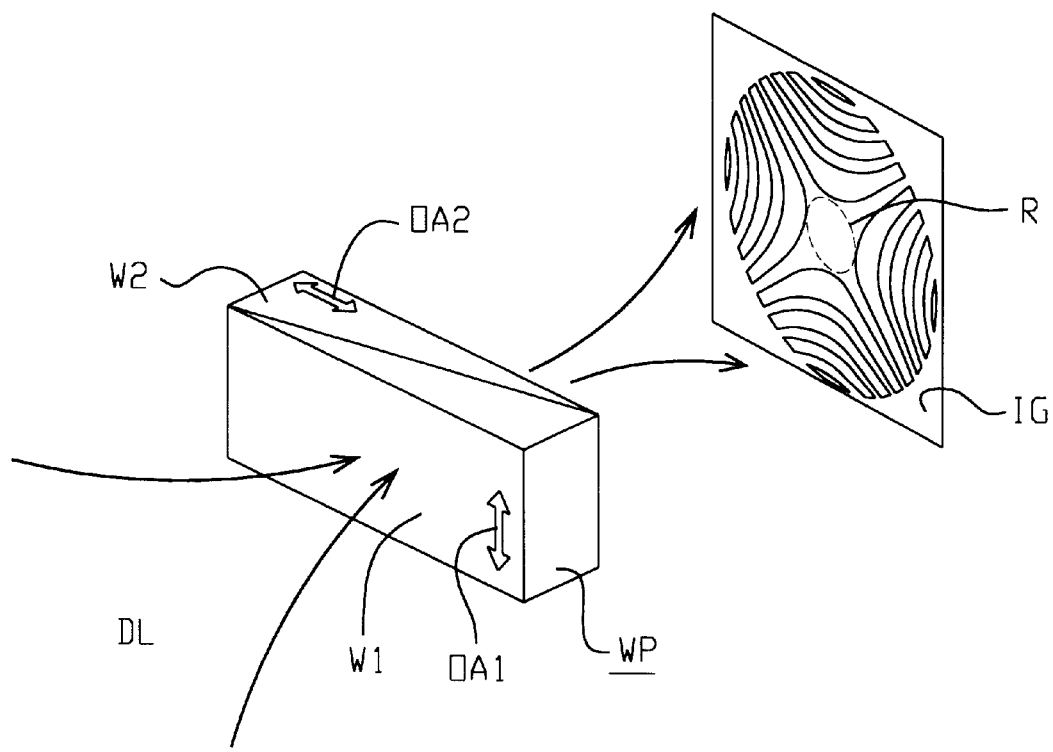

FIG. 2 shows a interference fringe pattern IG resulting from illuminating the Wollaston prism WP of FIG. 1 by divergent light DL. Curved interference fringes are caused by different angles of incidence, whereas a circular range R is drawn by a dashed line in the interference fringe pattern IG, in which range the phase distortion is equal to or less than $\lambda/4$.

Figure 3:
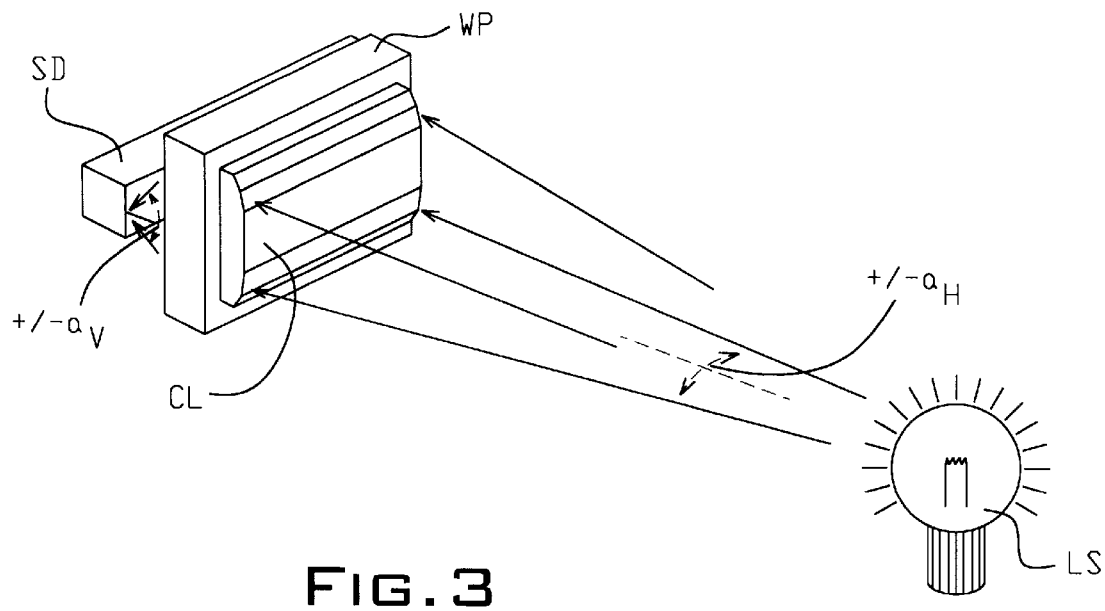

In FIG. 3, a Wollaston prism is WP represented having a cylindrical lens CL on the side of a light source LS the light of which shall be analyzed. The light of the light source LS is focused on a scanning device SD by the cylindrical lens CL. The arrangement according to FIG. 3 is particularly advantageous for a compact construction of a spectrometer since no additional optics are used between the Wollaston prism WP and the scanning device SD. In addition, the vertical angle of incidence $\alpha_V$ is increased in direction perpendicular to the orientation of the scanning device SD.

Figure 4:
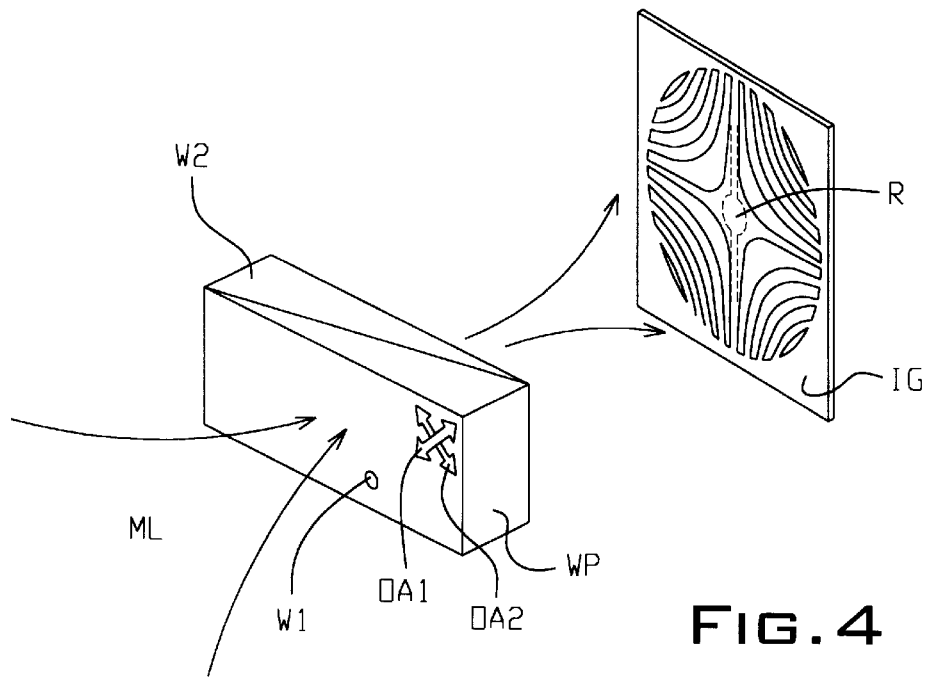

Furthermore, the optic axes of the birefringent wedges of the known Wollaston prism are both rotated by 45° to obtain a Wollaston prism WP according to the invention for which, in return to the polarization rotation of the optic axes, the phase deviations, in function of the angles of incidence, are now rotated by an azimuth angle of 45°. This so called 45°-Wollaston prism WP and the corresponding phase deviations are represented in FIG. 4. As in FIG. 2 for the known Wollaston prism, the phase deviations for the 45°-Wollaston prism according to the invention are shown in a interferogram IG. Through the comparison of the ranges R representing phase deviations of less than $\lambda/4$ shown in FIGS. 2 and 4, it becomes apparent that the range R in FIG. 4 is now larger for the Wollaston prism according to the invention than the range R in FIG. 2 for the known Wollaston prism. Besides the clear increase in the angle tolerance, the angle of incidence depends on the horizontal angle of incidence $\alpha_H$ whereas the result of the multiplication of the two angles of incidence $\alpha_H$ and $\alpha_V$ remains constant.

Figure 5:
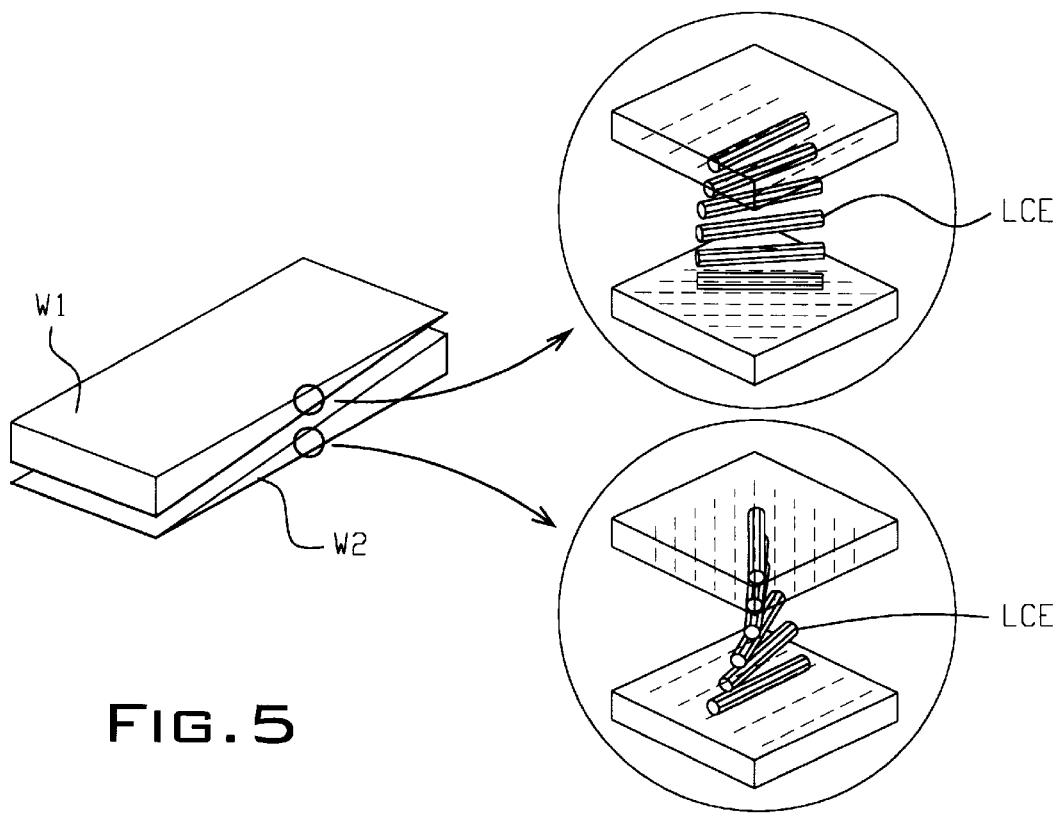

In FIG. 5, a Wollaston prism WP according to the present invention is shown consisting of two birefringent wedges W1 and W2 made of liquid crystal. The wedges W1 and W2 represent each a polarization rotation cell for an angle of 45°. On the right hand side of FIG. 5, the polarization rotation (twist) of the optic axes within the two liquid crystal wedges are shown. The Wollaston prism according to the present invention is obtained by providing a 90°-angle between the succeeding orientation planes of both liquid crystal wedges W1 and W2 in order that interference fringes are generated in the middle of the element and in order that symmetrical interferograms are obtained.

The use of nematic liquid crystals is particularly advantageous since they have the characteristics to be birefringent and also to possess the possibility of making them optical active. A definition of nematic liquid crystals can be found in "Introduction to liquid crystals" by E. B. Priestley et. al. (Plenum Press, New York and London, 1975, p. 16). In addition, the optical activity which is generated in the liquid crystal is achromatic, as desired in this application.

Besides liquid crystal wedges which provide a polarization rotation of 45°, it is also proposed according to the invention to provide Wollaston prisms with a higher angle of polarization rotation, e.g. of 90° or 180°. Depending on an application, different parameters, such as birefringence, optical activity, corresponding direction of polarization rotation, or maximal optical path difference must be optimized.

Figure 6:
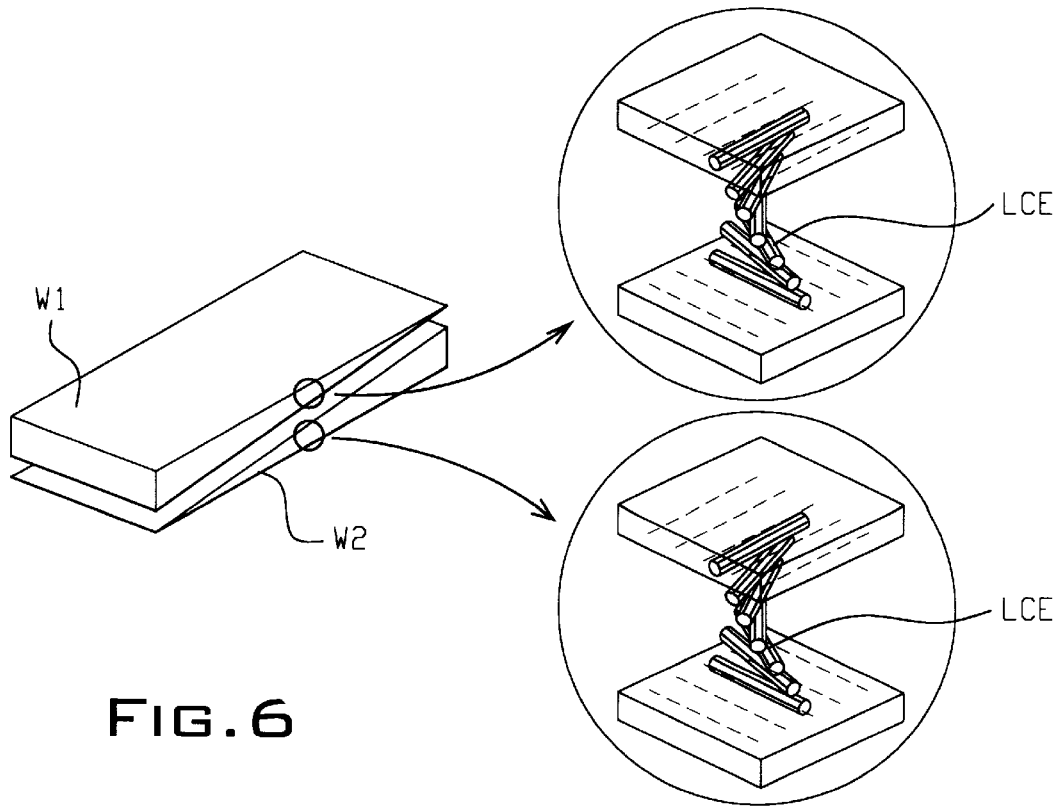

In FIG. 6, a Wollaston prism WP which provides a polarization rotation of 90° is represented. As in FIG. 5, the polarization rotation of the optic axes within the two liquid crystal wedges are shown on the right hand side.

As has been pointed out, it is a typical characteristic of the known Wollaston prism that the interference fringes are located within the Wollaston prism. To overcome this problem and in order to detect or record an interferogram with high contrast, it is known in the state of the art to provide an imaging system by which the interference plane can be transferred to the outside of the Wollaston prism.

Using liquid crystals for the birefringent wedges of a Wollaston prism, the interference plane can be transferred to the outside of the Wollaston prism by tilting the optic axis in one of the birefringent wedges. By using a Wollaston prism according to the invention a spectrometer is obtained that is very compact and, due to the low costs of liquid crystals, is very inexpensive.

It has already been pointed out that for increasing the angle acceptance (field of view) the use of a $\lambda/2$-delay plate between two identical birefringent wedges can be used. To significantly reduce the costs for such an arrangement, the $\lambda/2$-delay plate can be replaced by a twisted nematic cell which rotates the polarizing vector by 90°. Besides the cost reduction, a further advantage is obtained. The liquid crystal polarization rotation cell according to the invention provides a polarization rotation characteristic over a wide spectral range. Furthermore, the use of a 90°-liquid crystal polarization rotation cell in a Wollaston prism with an increased angle acceptance bears the advantage of having electro-optical characteristics which make the Wollaston prism switchable: By applying an electrical field, no polarization rotation occurs, the illumination intensities can be measured whereas the results of this measurement can be used to compensate any irregularities in the illumination. Without an electrical field, the interferogram can be recorded.

What is claimed is:

1. Wollaston prism comprising two birefringent wedges (W1, W2) joined by their hypotenuse to form a composite block, said wedges (W1, W2) having optic axes (OA1, OA2) to each other at right angle, wherein said optic axes (OA1, OA2) of said wedges (W1, W2) are rotated by an angle of 45° or 135°, respectively, with regard to a position wherein one of the optic axes (OA1, OA2) lies parallel to the plane formed by the hypotenuses, and wherein a polarization rotation element is provided between said birefringent wedges (W1, W2) whereas said polarization rotation element is performing a polarization rotation of up to 90°.

2. Prism according to claim 1, wherein each of said birefringent wedges (W1, W2) comprises an angle of polarization rotation which may be set to 45°, 90°, 135° or 180°.

3. Prism according to claim 1, wherein at least one of said birefringent wedges is made of liquid crystal.

4. Prism according to claim 3, wherein said liquid crystal is nematic.

5. Prism according to claim 3, wherein both birefringent wedges are made of a liquid crystal comprising an internal polarization rotation of polarization state of 90°.

6. Prism according to claim 3, wherein both birefringent wedges are made of a liquid crystal exhibiting a tilt angle with respect to the wedge surface.

7. Fourier transform spectrometer comprising a Wollaston prism according to any of claims 1 to 6.

8. Spectrometer according to claim 7, wherein a scanning device (SD) is provided to record the light intensities transmitted through the Wollaston prism.

9. Method to adjust a spectrometer according to claim 7, comprising the steps of:

applying an electrical field to the prism in order to suppress any polarization rotation of a polarizing vector, measuring light intensities by a scanning device (SD) and thereby detecting any irregularities of the illumination intensities, avoiding the electrical field for further spectral analysis, whereas the detected irregularities are compensated using the measurement results of the second step.

* * * * *